Figure 1:
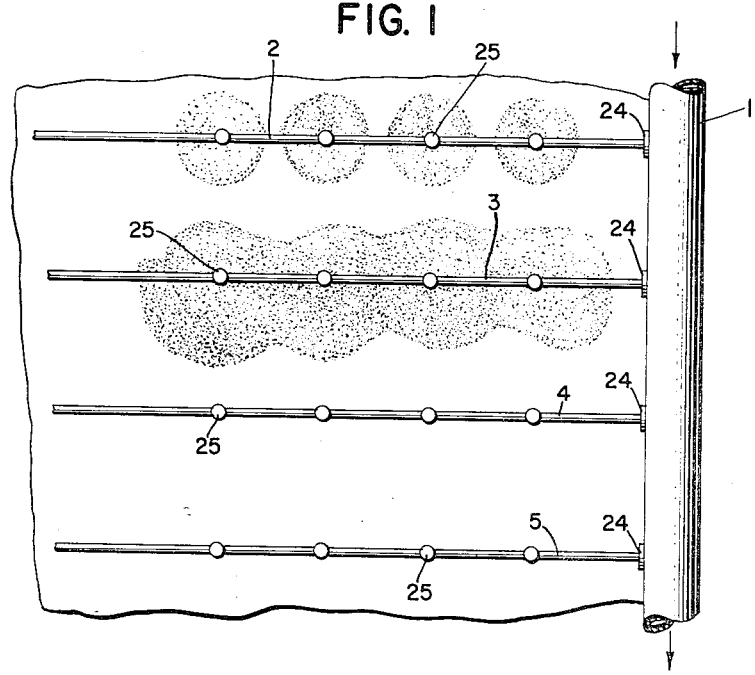
Figure 2:
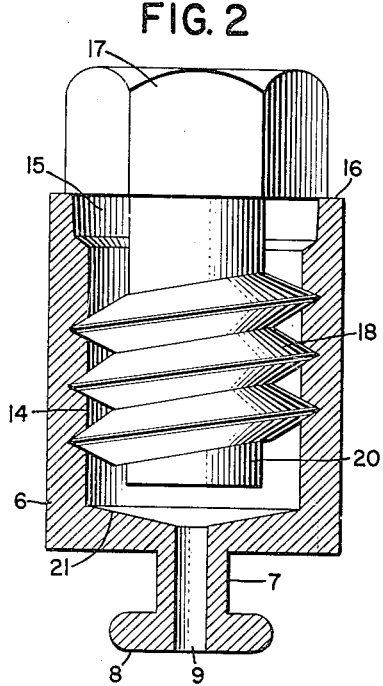
Figure 3:
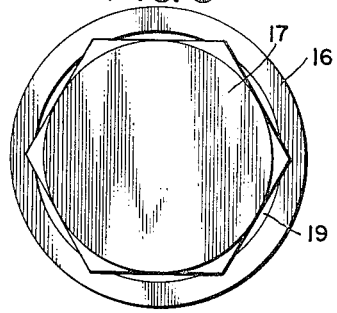

June 26, 1956     L. BLASS     2,752,201

METHOD OF AND MEANS FOR THE IRRIGATION OF LAND

Filed Sept. 21, 1949

INVENTOR
LUDWIG BLASS

BY Doe J. Hatfield

ATTORNEY

2,752,201

METHOD OF AND MEANS FOR THE IRRIGATION OF LAND

Ludwig Blass, Wembley, England

Application September 21, 1949, Serial No. 116,872

6 Claims. (Cl. 299—106)

Artificial irrigation systems which throw water through jet nozzles or spray nozzles aim at an even impingement on wide and more or less extensive areas of land, with the result that the water, which has to saturate each layer of soil before it can penetrate into the next layer, penetrates into the sub-soil only slightly, if at all, even at the greatest permissible rates of surface application.

It is also known to irrigate a narrow strip of land by placing on it a water filled porous canvas hose, through which the water oozes out at negligible speed. The impingement area takes the form of a narrow strip, from which the water spreads downward and, after substantial applications also sideways, but this only to a limited extent. The infiltration of water into the lower layers of the soil is much improved but the maintenance of the canvas hosing in good working condition is very difficult, because its pores, which must necessarily be very small, are very liable to clogging on the inside if the water is at all impure, and to sealing on the outside if it contains lime and magnesia salts.

According to the present invention I obtain an even better penetration of water into lower soil levels, reasonable security from clogging or sealing, and other advantages, by passing water through an impervious irrigation line provided with spaced watering points, and reducing the rate of issue of water through each of these points to an exceptionally low figure so as to obtain an impingement area under each of them whose greatest diameter is only a small fraction (½, ⅓, ¼, etc.) of the distance between adjoining watering points.

The operating pressure applied to such lines may be low, under 14.6 lbs. per square inch, and in many cases a head of less than 6 feet is even more satisfactory. The individual watering points must have a very high resistance to flow, and the terminal velocity of the water issuing from the nozzles should be low or even negligible, to avoid an unnecessary enlargement of the impingement area.

These impingement areas, which according to the invention should be non-contiguous, are preferably of a lower decimal order than the distance between the watering points, i. e. one tenth, one hundredth, etc., of it. For example, if nozzles are spaced 24 inches apart, the impingement areas may measure less than 2.4 inches, or even less than 0.24 inch across.

The use of porous canvas hosing concentrates the impingement area into narrow strips. It will be noted that my invention carries this concentration much further and reduces the impingement areas to widely separated small circles following each other along the line, greatly to the benefit of deeper penetration.

I have found that I can operate such lines to great advantage at the exceptionally low rate of flow of less than 1 gallon per hour per nozzle, and even at a rate of a small fraction (½, ⅓, ¼) thereof, which means that the water is issued drop after drop. At these extremely slow rates of supply the water is given time to soak down to a greater depth without disturbing the surface tilth or the crumb structure of the soil anywhere except perhaps in the actual impingement area, which however may measure as little as half an inch across. As the depth of impregnation under the impingement area increases the water will also spread sideways, but only very slowly, and mostly by capillarity, and result in a slowly widening moist surface circle. These circles of (secondary) spread may eventually touch and produce a moist surface strip, which in turn may coalesce with the strips produced by adjoining parallel lines. But this process may take 24 or 48 hours or more, and the total quantity of water supplied without the slightest detriment to tilth or crumb structure, say 6 gallons per foot run, will usually represent a considerable multiple of the quantity which can be applied by uniform impingement methods, thus showing that much of the water must have penetrated 12 to 24 inches deep, or even deeper. That this is so has been confirmed by irrigation experiments using identifiable watery solutions instead of water.

To obtain the exceptionally low rate of flow at each watering point which is characteristic of the present invention, I may employ individual nozzles at each watering point and provide them with an exceptionally high resistance to flow.

Taking as a unit of resistance the difference of pressure in kilograms per square centimetre required to force 1 litre of water per second through a nozzle (the test being carried out with water of 20° C. under a head of 1 metre, and assuming that the rate of flow is proportionate to the square root of the pressure), I find that the resistance of the nozzles should exceed 20,000 units. 50,000 to 500,000 units are more satisfactory, but as much as 2,000,000 and more may be desirable in some cases.

Holes or bores small enough to provide the required resistance to flow would issue water at a velocity which may unduly enlarge the impingement limits contemplated in this invention. To prevent this I may provide my nozzles with means for reducing the terminal velocity to a fraction of the maximum velocity prevailing in the hole, bore, or other resistive channel, preferably in the form of a terminal collecting chamber with ports whose combined cross-section is a multiple of the narrowest cross-section of the channel in the nozzle. In other words, the cross-section of the resistive channel should be a small fraction (½, ⅓, ¼ etc.) of the combined cross-sections of the outlet ports.

To prevent clogging by particles of dirt carried in the water, the nozzles should be protected by fine mesh strainers inserted in the water supply system at suitable points, but as the width of the mesh of the strainer must be rather smaller than the smallest width of the resistive channel in the nozzle, I prefer to impart to the latter an increased passability to dirt, by providing the resistive channel in the interface of two contacting geometrically regular (e. g. cylindrical) surfaces and making it circuitous, i. e. winding, zig-zagging, widening-and-narrowing in repeated succession, or baffling it, so as to alter repeatedly the velocity (vector) of the stream, be it merely numerically, or by change of direction, or by both means. In this manner I can provide a resistance to flow which is a multiple of that of a plain nozzle of the same minimum cross-section, i. e. of the same passability to dirt.

Another feature of the invention is the use, as irrigation lines of tubing made from impervious, pliable, and yielding rubberlike material, such as indiarubber or polyvinyl chloride. I may drill holes in these tubes at intervals, and provide the nozzles with a substantially flat flange carried by a reduced neck portion, so that they can simply be buttoned into the holes, in which they are held like rivets. If desired they may actually be riveted in their inserted position, or the tube wall above the flange may be compressed by screwing a suitable compression ring onto it.

The mains feeders supplying a plurality of irrigation lines according to the invention may also be made from rubber or rubberlike material, either partly or wholly, and may have connecting teats for the individual irrigation lines inserted in them in the same manner as described with reference to the nozzles.

These pliable lines are easy to assemble as well as to remove for storage, and can be assembled or detached from each other without plumbing. Similar advantages are obtained if rubber-connected rigid tubes, such as metal tubes, are employed.

The invention is further described with reference to the accompanying diagrammatic drawings.

Figure I is a plan view of part of an irrigation system in action.

Figures II and III are a sectional elevation and a plan view respectively of an irrigation nozzle.

The portion of an irrigation system shown in plan view in Figure I comprises a piece of rubber hosing 1, which is connected with the water supply and has four small holes drilled in it at distances of, say, 24 inches apart. Connecting teats 24 are inserted in these holes and irrigation lines 2, 3, 4, and 5 are slipped on to these teats and carry nozzles 25 of the type shown in Figures II and III at intervals of, say, 24 inches. In view of the small scale employed, the connecting teats and nozzles are only indicated by dots. The impingement areas under the individual nozzles, measuring perhaps ½ inch across, are too small to be shown in this plan view, but shaded circles surrounding the nozzles of line 2 indicate the spread of moisture on the surface after a substantial infiltration of water. In connection with line 3 it is shown how these areas may coalesce after even heavier applications of water to form a continuous strip wide enough to coalesce with a similar strip produced by an adjoining line.

The number of connecting teats on a mains hose and the number of nozzles carried by each rubber tube may be considerably greater than those shown in the drawing, which is meant to represent only a small section of a system.

The nozzle shown in Figures II and III consists of body or a socket 6 turned from round aluminum bar and provided with a reduced neck 7, a flange 8 and a comparatively wide bore 9. It is provided on the inside with a number of turns of a female thread 14, which is severely truncated, say 50, 75 or more per cent of the height of the thread being missing. The open end is counterbored to produce a collecting chamber 15, leaving a narrow rim 16 which is just wide enough to serve as support for the corners of the hexagon head 17 of the aluminum screw 18, while leaving six small moon-shaped (lunular) ports 19, serving as exit ports for the water collected in the chamber 15 formed by the rim 16 and the head of the screw 17.

It will be noted that the water, entering the nozzle through 9, will have to pass round the helical channel left between the threads of the screw 18 and the truncated female thread 14. Owing to the continual change of direction involved in circling repeatedly round the screw the water will lose much more energy than it would in a plain nozzle of the same cross-section as that of the helical channel. It eventually collects in the chamber 15 and issues through the six ports 19, whose width should be smaller but whose combined cross-section should be much greater than those of the channel.

The lower corner 20 of the screw should approach the conical bottom 21 of the screw 18, to a distance which is also smaller than the width of the helical channel so as to provide a screening slit for particles of dirt which might block the channel. The same effect is produced by the lunular gaps 19 with regard to particles of dirt which might enter the nozzle from the outside.

Wherever I employ the term "small fraction" in this specification or the claims attached thereto, I desire it to be understood in the strictly limited sense of the reciprocal of a multiple, and standing for ½, ⅓, ¼ etc.

I claim:

1. An irrigation line made of impervious material, watering nozzles provided in said line at intervals, a circuitous resistive channel in each of said watering nozzles restricting the issue of water, and means for reducing the terminal velocity of the water to a small fraction of that prevailing at the narrowest cross-section of said channel.

2. A land irrigation method comprising passing water through an impervious irrigation line provided with a multiplicity of spaced watering nozzles, each nozzle having a tortuous path for highly resisting the flow therein, after which the velocity of flow in each nozzle is reduced so that the water comes out of each nozzle as individual drops whereby to obtain on level land impingement areas, each having diameters which is only a small fraction of the distance between adjoining watering nozzles.

3. An irrigation nozzle comprising a circuitous resistive channel, a collecting chamber arranged beyond said channel and adapted to reduce the velocity of the water coming from the said channel, and an outlet adapted to issue the water at a terminal velocity which is only a small fraction of that prevailing in the narrowest cross-section of said channel.

4. An irrigation nozzle comprising at least two parts provided with geometrically regular surfaces in contact with each other, a single and circuitous resistive channel provided in the said two contacting surfaces, a collecting chamber arranged beyond said channel and adapted to reduce the velocity of the water coming from the said channel, and an outlet adapted to issue the water at a terminal velocity which is only a small fraction of that prevailing at the narrowest cross-section of said channel.

5. An irrigation nozzle comprising a screw socket having at least one full turn of a female thread, and a screw having at least one full turn of a male thread to fit said female thread, one of these threads being truncated so as to provide at least one full turn of a helical resistive channel, a collecting chamber arranged beyond said channel and adapted to reduce the velocity of the water coming from the said channel, and at least one outlet port adapted to issue the water at a terminal velocity which is only a small fraction of that prevailing in the narrowest cross-section of said channel.

6. An irrigation nozzle comprising a screw socket having a reduced neck portion, a flange carried by said neck, a number of turns of a female thread and a counterbore, and also comprising a screw having a number of turns of a male thread to fit said socket and a polygonal head, one of the said threads being severely truncated to provide a single helical resistive channel, the polygonal head of the screw resting on the counter-bore of the socket so as to complete a collecting chamber and to leave a number of outlet holes whose combined cross-section is a multiple of the cross-section of the said helical channel.

References Cited in the file of this patent

UNITED STATES PATENTS

| | | |
|---|---|---|
| 574,701 | Barnes | Jan. 5, 1897 |
| 717,042 | Smith | Dec. 30, 1902 |
| 1,129,585 | Newsom | Feb. 23, 1915 |
| 1,213,563 | Williams | Jan. 23, 1917 |
| 1,430,620 | Brauer | Oct. 3, 1922 |
| 1,520,048 | Baird | Dec. 23, 1924 |
| 1,783,237 | Greer | Dec. 2, 1930 |
| 1,830,833 | Green | Nov. 10, 1931 |

(Other references on following page)

UNITED STATES PATENTS

| | | |
|---|---|---|
| 1,883,656 | Estock | Oct. 18, 1932 |
| 2,083,282 | Thompson | June 8, 1937 |
| 2,092,674 | Kennedy | Sept. 7, 1937 |
| 2,148,419 | Parker | Feb. 21, 1939 |
| 2,196,456 | Charrain | Apr. 9, 1940 |
| 2,218,110 | Hosmer | Oct. 15, 1940 |
| 2,314,525 | Summers | Mar. 23, 1943 |
| 2,323,115 | Bryant | June 29, 1943 |
| 2,332,350 | Scritchfield | Oct. 19, 1943 |
| 2,387,639 | Spanel | Oct. 23, 1945 |
| 2,459,752 | Wilson | Jan. 18, 1949 |
| 2,501,910 | Oughton | Mar. 28, 1950 |
| 2,563,300 | Aker | Aug. 7, 1951 |

FOREIGN PATENTS

| | | |
|---|---|---|
| 1,056 | Great Britain | Jan. 24, 1885 |